(12) United States Patent
Guilford

(10) Patent No.: US 7,411,937 B2
(45) Date of Patent: Aug. 12, 2008

(54) TIME SYNCHRONIZATION SYSTEM AND METHOD FOR SYNCHRONIZING LOCATING UNITS WITHIN A COMMUNICATION SYSTEM USING A KNOWN EXTERNAL SIGNAL

(75) Inventor: John H. Guilford, Stanwood, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 217 days.

(21) Appl. No.: 11/199,787

(22) Filed: Aug. 9, 2005

(65) Prior Publication Data

US 2007/0053340 A1    Mar. 8, 2007

(51) Int. Cl.
 *H04J 3/06* (2006.01)
(52) U.S. Cl. .................. 370/350; 370/324; 455/502
(58) Field of Classification Search ................ 370/350, 370/324, 395.62, 503, 504, 509, 510; 455/502, 455/456.1, 404.2, 561, 456.2, 67.6, 433, 455/13.1; 375/343, 364
See application file for complete search history.

(56) References Cited

U.S. PATENT DOCUMENTS

| | | | | |
|---|---|---|---|---|
| 5,119,104 A * | 6/1992 | Heller | ........................ | 342/450 |
| 5,469,409 A | 11/1995 | Anderson et al. | | |
| 6,108,558 A * | 8/2000 | Vanderspool, II | ........ | 455/456.2 |
| 6,185,429 B1 * | 2/2001 | Gehrke et al. | ................ | 455/502 |
| 6,266,012 B1 * | 7/2001 | Kangas et al. | ................ | 342/387 |
| 6,281,843 B1 | 8/2001 | Evtioushkine et al. | | |
| 6,493,539 B1 * | 12/2002 | Falco et al. | ............... | 455/67.11 |
| 6,539,229 B1 * | 3/2003 | Ali | ........................... | 455/456.1 |
| 6,618,452 B1 * | 9/2003 | Huber et al. | ................. | 375/343 |
| 7,072,612 B2 * | 7/2006 | Soliman | ..................... | 455/13.1 |
| 7,269,427 B2 * | 9/2007 | Hoctor et al. | ............. | 455/456.2 |
| 2002/0183069 A1 * | 12/2002 | Myr | ........................... | 455/456 |
| 2003/0220765 A1 * | 11/2003 | Overy et al. | ................. | 702/158 |
| 2004/0072582 A1 * | 4/2004 | Aljadeff et al. | .......... | 455/456.1 |
| 2006/0125685 A1 * | 6/2006 | Jeon et al. | .............. | 342/357.09 |

FOREIGN PATENT DOCUMENTS

WO    2005 047926    5/2005

OTHER PUBLICATIONS

GB Search Report Under Section 17 dated Sep. 12, 2006.

* cited by examiner

*Primary Examiner*—Tan Trinh

(57) ABSTRACT

A time synchronization system synchronizes local clocks of locating units within a communication system using a known external signal. Each of the locating units receives a radio frequency (RF) signal from a transmitter at a known geographical location and measures the RF signal to produce a respective measurement of the signal and a respective timestamp of the measurement recorded at substantially the same time of the local clocks of the locating units. A controller determines a measured time difference of arrival between the locating units using the measurements and timestamps, computes a time synchronization error between the locating units from a difference between the measured time difference of arrival and an expected time difference of arrival and provides a respective time adjustment to each of the locating units to offset the time synchronization error.

21 Claims, 2 Drawing Sheets

TIME SYNCHRONIZATION SYSTEM AND METHOD FOR SYNCHRONIZING LOCATING UNITS WITHIN A COMMUNICATION SYSTEM USING A KNOWN EXTERNAL SIGNAL

BACKGROUND OF THE INVENTION

There are a number of techniques currently available to determine the geographical location of a radio device within a radio communication system. One technique of positioning a radio device is the time difference of arrival (TDOA) method. TDOA systems operate by placing locating units at geographically disbursed locations within a coverage area of the locating devices. The locating units may be stand-alone units or may be integrated with a base station of a wireless telephone network. For example, the coverage area may include a portion of a wide area wireless network or a portion of a local area wireless network.

The locating units operate in either a signal reception mode to receive a signal from the radio device or in a signal transmission mode to transmit a signal to the radio device. When the locating units are configured to receive a signal transmitted from the radio device, each locating unit timestamps the reception of the signal. The differences in the arrival times between the locating devices are compared using, for example, correlation methods, to produce intersecting hyperbolic lines from which the geographical location of the radio device is estimated. When the locating units are configured to transmit respective signals to the radio device, the radio device timestamps the arrival of each of the respective signals. The time difference of rival between the timestamps, along with the position of each of the locating units, is used to calculate the geographical location of the radio device.

Regardless of the TDOA mode, the locating units must be accurately synchronized to each other. For example, in signal reception mode, the local clocks of the locating units must be synchronized in time to facilitate a meaningful comparison of the timestamps. In signal transmission mode, the local clocks of the locating units must be synchronized to control the timing of transmission of the signal from each of the locating units. Typically, time synchronization is accomplished by periodically adjusting the local clock of each locating unit to synchronize the local clocks with a reference clock.

Three common techniques for time synchronization include providing dedicated cabling between the locating units, connecting the locating units to a computer network using a protocol, such as IEEE 1588 and using an external time reference, such as a Global Positioning System (GPS) clock. However, using dedicated cabling presents the obvious disadvantage of purchasing and installing the dedicated cabling, especially when the locating units are geographically distant from one another. In addition, highly accurate time synchronization may not be possible when using a network with multiple switches and/or routers between the locating units. For example, when using a T1/E1 link with multiple switches/routers, inbound signals may traverse a different path from outbound signals, thereby producing different propagation delays in inbound and outbound traffic.

Furthermore, although GPS enables highly accurate time synchronization, GPS requires each locating unit to include an expensive GPS receiver, which may be cost-prohibitive. In addition, GPS only works in areas where the GPS receiver has access to a sufficient number of GPS satellites. For example, GPS synchronization may not be possible for locating units that are located in remote areas, in the interior of a building or underground.

As a result, there is a need for a time synchronization system that synchronizes the local clocks of locating units without dedicated cabling, networking or expensive GPS receivers.

SUMMARY OF THE INVENTION

Embodiments of the present invention provide a time synchronization system for synchronizing local clocks of locating units within a communication system using a known external signal. Each of the locating units receives a radio frequency (RF) signal from a transmitter at a known geographical location and measures the RF signal to produce a respective measurement of the received RF signal and a respective timestamp of the measurement recorded at substantially the same time of each of the local clocks of the locating units. A controller determines a measured time difference of arrival between the locating units using the timestamps and measurements, computes a time synchronization error between the locating units from a difference between the measured time difference of arrival and an expected time difference of arrival and provides a respective time adjustment to each of the locating units to offset the time synchronization error.

In one embodiment, the expected time difference of arrival is determined from a respective distance between each of the locating units and the transmitter. The controller determines the measured time difference of arrival by comparing the two measurements adjusted by their respective timestamps. The time adjustment for each locating unit is determined by splitting the time synchronization error between the locating units. For example, in one embodiment, the time synchronization error is split equally between the locating units. In another embodiment, the local clock of one of the locating units is used as a reference clock, and the time adjustments for the other locating units are based on the time synchronization error from the reference clock. The time adjustments are used to synchronize the local clocks of the locating units.

Embodiments of the present invention further provide a method for synchronizing locating units within a communication system. The method includes receiving, from two or more locating units, respective measurements of a radio frequency (RF) signal transmitted from a transmitter at a known geographical location and respective timestamps of the measurements recorded at the locating units. Each measurement is recorded at substantially the same time of a respective local clock of the locating units. The method further includes determining a measured time difference of arrival between the locating units using the timestamps and the measurements, computing a time synchronization error between the locating units from a difference between the measured time difference of arrival and an expected time difference of arrival and providing a respective time adjustment to each of the locating units to offset the time synchronization error.

BRIEF DESCRIPTION OF THE DRAWINGS

The disclosed invention will be described with reference to the accompanying drawings, which show exemplary embodiments of the invention and which are incorporated in the specification hereof by reference, wherein.

DETAILED DESCRIPTION OF THE EXEMPLARY EMBODIMENTS

Figure 1:
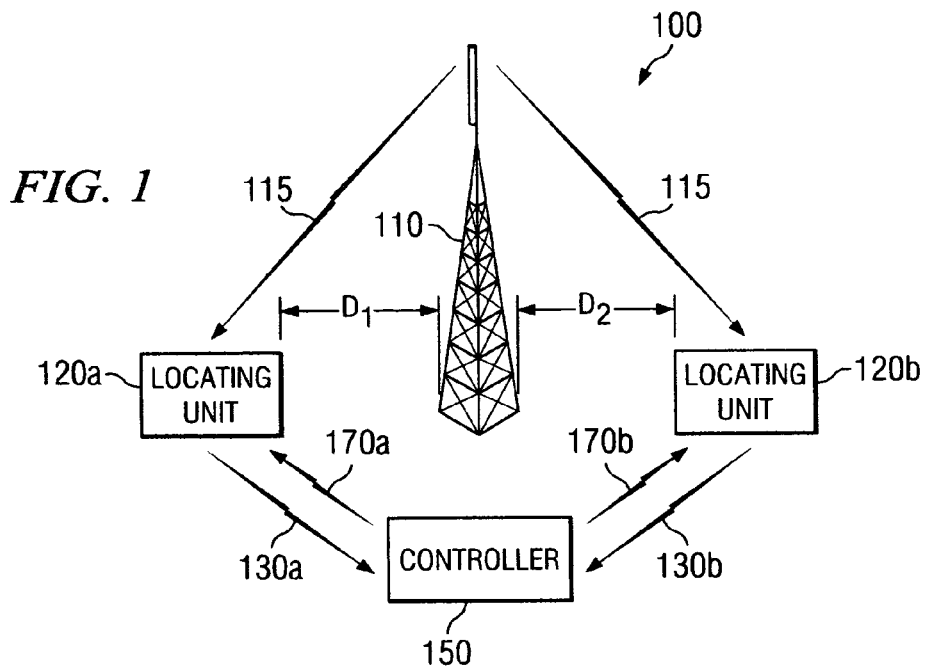
FIG. 1 illustrates a time synchronization system for synchronizing locating units, in accordance with embodiments of the present invention.

FIG. 1 is a schematic block diagram illustrating an exemplary and simplified time synchronization system 100. The time synchronization system 100 includes a transmitter 110, two or more locating units 120a and 120b and a controller 150. The locating units 120a and 120b form at least a part of a radio communication system. For example, the radio communication system may include a series of receivers located within an area networked (e.g., via the Internet) together with the controller 150. In an exemplary embodiment, the locating units 120a and 120b operate in a signal reception mode to locate radio devices (not shown) within the radio communication system using a time difference of arrival (TDOA) positioning method. One example of a radio device is a cellular telephone.

The transmitter 110 and the locating units 120a and 120b are positioned within the time synchronization system 100 at known geographical locations, which may be fixed or variable. In embodiments where the location of the transmitter and/or locating units 120a and 120b varies as a function of time, the exact location of the transmitter and/or locating units 120a and 120b at any particular time is known. As a result, the distance D1 between the transmitter 110 and locating unit 120a and the distance D2 between the transmitter 110 and locating unit 120b is known.

The transmitter 110 transmits a radio frequency (RF) signal 115 over an air interface, which is received by locating units 120a and 120b. The RF signal 115 may be any signal transmitted by a known transmitter 110. For example, in one embodiment, the RF signal 115 is an FM signal transmitted by an existing radio station transmitter 110. In another embodiment, the transmitter 110 is dedicated for the purpose of transmitting the RF signal 115.

Upon receiving the RF signal 115, each locating unit 120a and 120b measures the RF signal 115 and records a measurement of the received RF signal 115 and a timestamp of the measurement at substantially the same time. In an exemplary embodiment, each locating unit 120a and 120b includes a respective local clock and each locating unit 120a and 120b is triggered to record the measurement and timestamp of the RF signal 115 at substantially the same time of the respective local clocks. For example, if the trigger time is X, location unit 120a records a measurement and timestamp of the RF signal 115 when the local clock of location unit 120a reaches X. Likewise, location unit 120b records a measurement and timestamp of the RF signal 115 when the local clock of location unit 120b reaches X. In an exemplary embodiment, each of the locating units 120a and 120b is set to periodically measure the RF signal 115 for a predetermined time interval. For example, each locating unit 120a and 120b can measure the RF signal 115 for 500 ns once every second.

The measurements and associated timestamps (collectively referred to as 130a and 130b) from each locating unit 120a and 120b are transmitted to the controller 150. In one embodiment, the controller 150 is implemented in a stand-alone device having a wireless or wire lined connection to locating units 120a and 120b. In another embodiment, the controller 150 is implemented in one of the locating units 120a or 120b. In a further embodiment, the controller 150 is distributed throughout the time synchronization system 100. For example, the controller 150 can be distributed between the locating units 120a and 120b.

The controller 150 determines a measured time difference of arrival between the locating units 120a and 120b using the recorded measurements and timestamps 130a and 130b of the RF signal measured at each locating unit 120a and 120b. For example, in one embodiment, the controller 150 compares the measurements to determine a time offset between the measurements that produces the highest correlation between the measurements. The controller 150 then adjusts the determined time offset based on the respective timestamps to account for any differences in the timestamps of the measurements. The adjusted time offset represents the measured time difference of arrival of the RF signal at the locating units 120a and 120b.

The controller 150 further determines an expected time difference of arrival between the locating units 120a and 120b representing the expected time difference of arrival for signals received by the locating units 120a and 120b from the transmitter 110. Since the distances D1 and D2 between the transmitter 110 and locating units 120a and 120b, respectively, are known, and distance is a product of velocity and time, the expected time difference of arrival (TDOA) can be computed as:

Expected TDOA=(D1−D2)/(speed of light).

From the expected TDOA and the measured TDOA, the controller 150 computes a time synchronization error between the locating units 120a and 120b. The time synchronization error is simply the difference between the expected TDOA and the measured TDOA. For example, if the expected TDOA is 100 nanoseconds (ns) and the measured TDOA is 110 ns, the time synchronization error is 10 ns.

Based on the time synchronization error, the controller 150 determines a respective time adjustment for each locating unit 120a and 120b and transmits the respective time adjustment 170a and 170b to the locating units 120a and 120b, respectively. The time adjustments provided to each locating unit 120a and 120b are used by the locating units 120a and 120b to offset the time synchronization error. For example, in one embodiment, the time adjustment 170a and 170b provided to each locating unit 120a and 120b is a measure of the clock error of the locating unit's 120a or 120b local clock. This clock error can be fed into a servo loop to drive the clock error to zero. As a result, the respective time adjustments 170a and 170b are used to synchronize the local clocks of the locating units 120a and 120b.

In one aspect of the invention, the controller 150 divides the time synchronization error either equally or randomly among the locating units 120a and 120b to determine the respective time adjustment 170a and 170b for each of the locating units 120a and 120b. For example, if the time synchronization error is 10 ns, the controller 150 can generate time adjustments 170a and 170b for locating units 120a and 120b of 5 ns for each. In another aspect of the invention, the controller 150 sets the local clock of one of the locating units 120a or 120b as a reference clock, and determines the respective time adjustments for the other locating unit(s) 120a or 120b based on the time synchronization error from the reference clock. Using the same example of a 10 ns time synchronization error, the controller 150 can set the local clock of locating unit 120a as the reference clock and generate a time adjustment 170b of 10 ns to locating unit 120b. Since the TDOA method relies solely on relative time synchronization between the locating units 120a and 120b, the absolute time is irrelevant.

Figure 2:
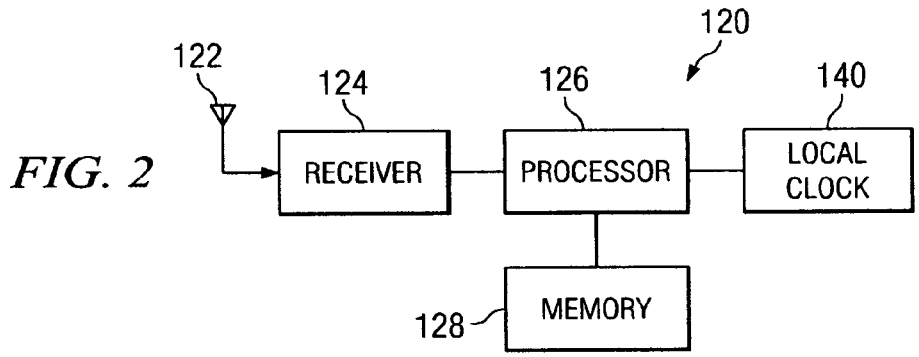
FIG. 2 is a block diagram of an exemplary locating unit, in accordance with embodiments of the present invention.

As shown in FIG. 2, each of the location units 120 includes at least an antenna 122, receiver 124, processor 126, memory 128 and local clock 140. The antenna 122 receives the known RF signal sent by the transmitter and provides the RF signal to the receiver 124, which amplifies and filters the RF signal. The processor 126 measures the RF signal and records a measurement of the RF signal and timestamp of the measurement at a predetermined time of the local clock 140. The processor 126 provides the measurement and timestamp to the controller (shown in FIG. 1) to ascertain the time synchronization error between the local clock 140 of the location unit 120 and the local clocks of other location units. The antenna 122 or processor 126 receives the time adjustment from the controller, and the processor 126 uses the received time adjustment to adjust the local clock 140. For example, the processor 126 can input the time adjustment to a servo loop to drive the time synchronization error between the location unit 120 and other location units to zero.

The processor 126, and more generally, as used herein, the term "processor" includes any type of processing device, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions stored in memory 128.

Figure 3:
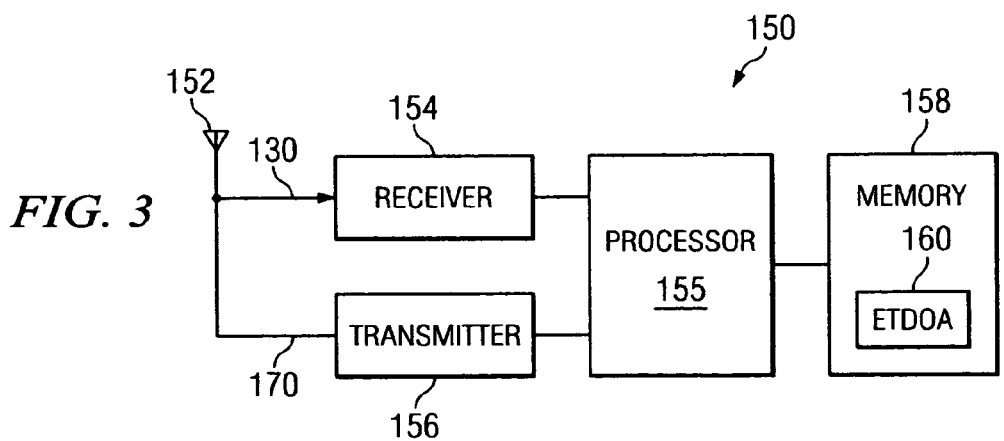
FIG. 3 is a block diagram of an exemplary controller for determining a time synchronization error, in accordance with embodiments of the present invention.

As shown in FIG. 3, the controller 150 includes an antenna 152, receiver 154, processor 155, transmitter 156 and memory 158. The antenna 152 receives the measurements and associated timestamps 130 from the respective locating units as RF signals and provides the measurements/timestamps 130 to the receiver 154 for amplification and filtering. The processor 155 compares the measurements/timestamps 130 from each locating unit to determine a measured TDOA between the locating units. For example, the controller 150 determines the measured TDOA from a time offset between the measurements adjusted to account for any differences in the timestamps.

Figure 4:
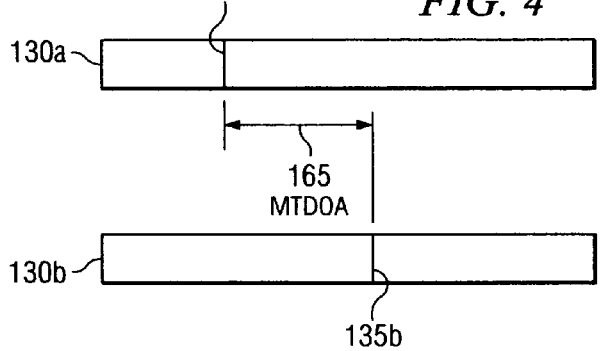
FIG. 4 is a timing diagram illustrating the comparison of timestamps in measured signals to determine a measured time difference of arrival, in accordance with embodiments of the present invention.

FIG. 4 is a timing diagram illustrating the comparison of measurements 130a and 130b of an RF signal, respectively, to determine a measured time difference of arrival 165. As can be seen in FIG. 4, the controller receives measurements 130a and 130b, each including a respective timestamp. Measurement 130a represents the RF signal transmitted from the transmitter and measured by a first locating unit. Measurement 130b represents the RF signal transmitted from the transmitter and measured by a second locating unit. Since each locating unit is triggered at substantially the same local clock time to timestamp the measured RF signal, the controller can measure the TDOA 165 between the locating units by comparing the measurements 130a and 130b.

For example, the controller can slide measurements 130a and 130b past each other to determine a best fit (highest correlation) between the measurements 130a and 130b, represented by points 135a and 135b. From the highest correlation points 135a and 135b, the controller can determine the time offset between the correlation points 135a and 135b in the measurements 130a and 130b, which represents the measured time difference of arrival 165 of the RF signal at the locating units. The controller then compares the timestamps of each of the measurements 130a and 130b and adjusts the time offset to account for any differences between the timestamps.

Referring again to FIG. 3, the processor 155 further computes an expected time difference of arrival (TDOA) 160 between the locating units and stores the expected TDOA 160 in memory 158. From the expected TDOA 160 and the measured TDOA, the processor 155 computes a time synchronization error between the locating units and determines a respective time adjustment 170 for each locating unit based on the time synchronization error. The processor 155 provides the time adjustments 170 to the transmitter, which generates RF signals including the time adjustments 170 and transmits the RF signals including the respective time adjustments 170 to the locating units via the antenna 152.

In other embodiments, the controller 150 receives the measurements and timestamps and/or transmits the time adjustments via a wire lined connection to one or more location units. In such embodiments, the antenna 152, receiver 154 and/or transmitter 156 of the controller 150 are not used, and may not be included in the controller 150.

Figure 5:
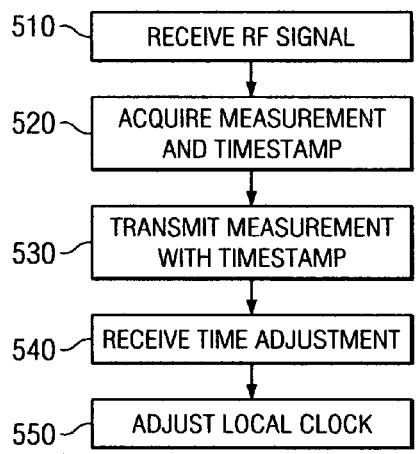
FIG. 5 illustrates an exemplary process for synchronizing a local clock of a locating unit, in accordance with embodiments of the present invention.

FIG. 5 illustrates an exemplary process 500 for synchronizing a local clock of a locating unit, in accordance with embodiments of the present invention. At block 510, a known RF signal from a known location is received at the locating unit, and at block 520, the locating unit acquires a measurement and timestamp of the RF signal at a predetermined time of the local clock of the locating unit. At block 530, the locating unit transmits the measurement of the received RF signal with the associated timestamp to a controller for use in determining a time adjustment for the locating unit. At block 540, the locating unit receives a time adjustment, and at block 550, adjusts the local clock based on the time adjustment to synchronize the local clock of the locating unit with the local clocks of other locating units.

Figure 6:
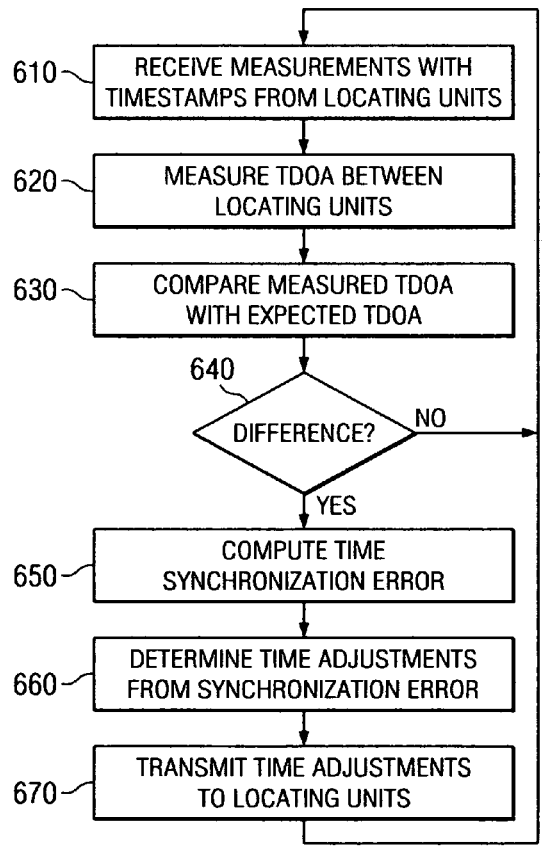
FIG. 6 illustrates an exemplary process for determining time adjustments to synchronize local clocks of locating units, in accordance with embodiments of the present invention.

FIG. 6 illustrates an exemplary process 600 for determining time adjustments to synchronize local clocks of locating units, in accordance with embodiments of the present invention. At block 610, measurements with timestamps are received from two or more locating units within a radio communication system. At block 620, the time difference of arrival (TDOA) between the two or more locating units is measured using the received measurements and timestamps. At block 630, the measured TDOA is compared to an expected TDOA between the locating units, and at block 640, the time synchronization error between the locating units is computed at block 650. At block 660, the time synchronization error is used to determine time adjustments for each of the locating units that offset the time synchronization error. At block 670, the determined time adjustments are transmitted to the locating units to synchronize the locating units with each other.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A controller for synchronizing locating units in a radio communication system, the controller comprising:
    a receiver configured to receive from two or more locating units respective measurements of a radio frequency (RF) signal and respective timestamps of said respective measurements, the RF signal being transmitted to the two or more locating units from a transmitter at a known geographical location, wherein each of said timestamps is recorded at substantially the same time of a respective local clock of said two or more locating units; and
    a processor operable to determine a measured time difference of arrival between said two or more locating units using said measurements and said respective timestamps, to compute a time synchronization error between said two or more locating units from a difference between said measured time difference of arrival and an expected time difference of arrival and to provide a respective time adjustment to each of said two or more locating units to offset said time synchronization error.

2. The controller of claim 1, wherein said processor is further operable to determine said expected time difference of arrival from a respective distance between each of said two or more locating units and said transmitter.

3. The controller of claim 1, wherein said processor is further operable to compare said measurements of said measured signals to determine said measured time difference of arrival.

4. The controller of claim 3, wherein said processor is further operable to determine a time offset between highest correlation points of said measurements and to adjust said time offset using said respective timestamps to determine said measured time difference of arrival.

5. The controller of claim 1, wherein said processor is further operable to divide said time synchronization error between said two or more locating units to determine said respective time adjustment for each of said two or more locating units; wherein each said respective time adjustment is used to synchronize said local clocks of said two or more locating units.

6. The controller of claim 5, wherein said processor is further operable to divide said time synchronization error equally between said two or more locating units to determine said respective time adjustment for each of said two or more locating units.

7. The controller of claim 5, wherein said processor is further operable to set said local clock of one of said two or more locating units as a reference clock and to determine said respective time adjustment for other ones of said two or more locating units based on said time synchronization error from said reference clock.

8. The system of claim 1, wherein each of said locating units is further operable to adjust said respective local clock using said respective time adjustment to synchronize said local clocks of said locating units.

9. The system of claim 8, wherein said controller is further operable to divide said time synchronization error between said locating units to determine said respective time adjustment for each of said locating units.

10. The system of claim 8, wherein said controller is further operable to set said local clock of one of said locating units as a reference clock and to determine said respective time adjustment for other ones of said locating units based on said time synchronization error from said reference clock.

11. A time synchronization system, comprising:
locating units within a radio communication system and configured to receive a radio frequency (RF) signal from a transmitter at a known geographical location, each of said locating units measuring said RF signal to produce respective measurements and respective timestamps of said measurements recorded at substantially the same time of a respective local clock of each of said locating units; and
a controller operable to determine a measured time difference of arrival between said locating units using said measurements and said respective timestamps, to compute a time synchronization error between said locating units from a difference between said measured time difference of arrival and an expected time difference of arrival and to provide a respective time adjustment to each of said locating units to offset said time synchronization error.

12. The system of claim 11, wherein said controller is further operable to determine said expected time difference of arrival from a respective distance between each of said locating units and said transmitter.

13. The system of claim 11, wherein said controller is further operable to compare said measurements to determine said measured time difference of arrival.

14. The system of claim 13, wherein said controller is further operable to determine a time offset between highest correlation points of said measurements and to adjust said time offset using said respective timestamps to determine said measured time difference of arrival.

15. The system of claim 11, wherein each of said locating units is further operable to periodically measure said RF signal for a predetermined time interval.

16. The system of claim 11, wherein said locating units provide respective signals for use in locating radio devices within the radio communication system using time difference of arrival.

17. A method for synchronizing locating units within a communication system, comprising:
receiving from two or more locating units respective measurements of a radio frequency (RF) signal, transmitted to the two or more locating units from a transmitter at a known geographical location, and respective timestamps of said measurements recorded at said two or more locating units, wherein each of said timestamps are recorded at substantially the same time of respective local clocks of said two or more locating units;
determining a measured time difference of arrival between said two or more locating units using said measurements and said respective timestamps;
computing a time synchronization error between said two or more locating units from a difference between said measured time difference of arrival and an expected time difference of arrival; and
providing a respective time adjustment to each of said two or more locating units to offset said time synchronization error.

18. The method of claim 17, further comprising:
determining said expected time difference of arrival from a respective distance between each of said locating units and said transmitter.

19. The method of claim 17, wherein said determining said measured time difference of arrival further includes:
comparing said measurements to determine a time offset between highest correlation points of said measurements; and
adjusting said time offset using said respective timestamps to determine said measured time difference of arrival.

20. The method of claim 17, further comprising:
splitting said time synchronization error equally between said locating units to determine said respective time adjustment for each of said locating units.

21. The method of claim 17, wherein said local clock of one of said locating units is a reference clock, the method further comprising:
determining said respective time adjustment for other ones of said locating units based on said time synchronization error from said reference clock.

* * * * *